UNITED STATES PATENT OFFICE.

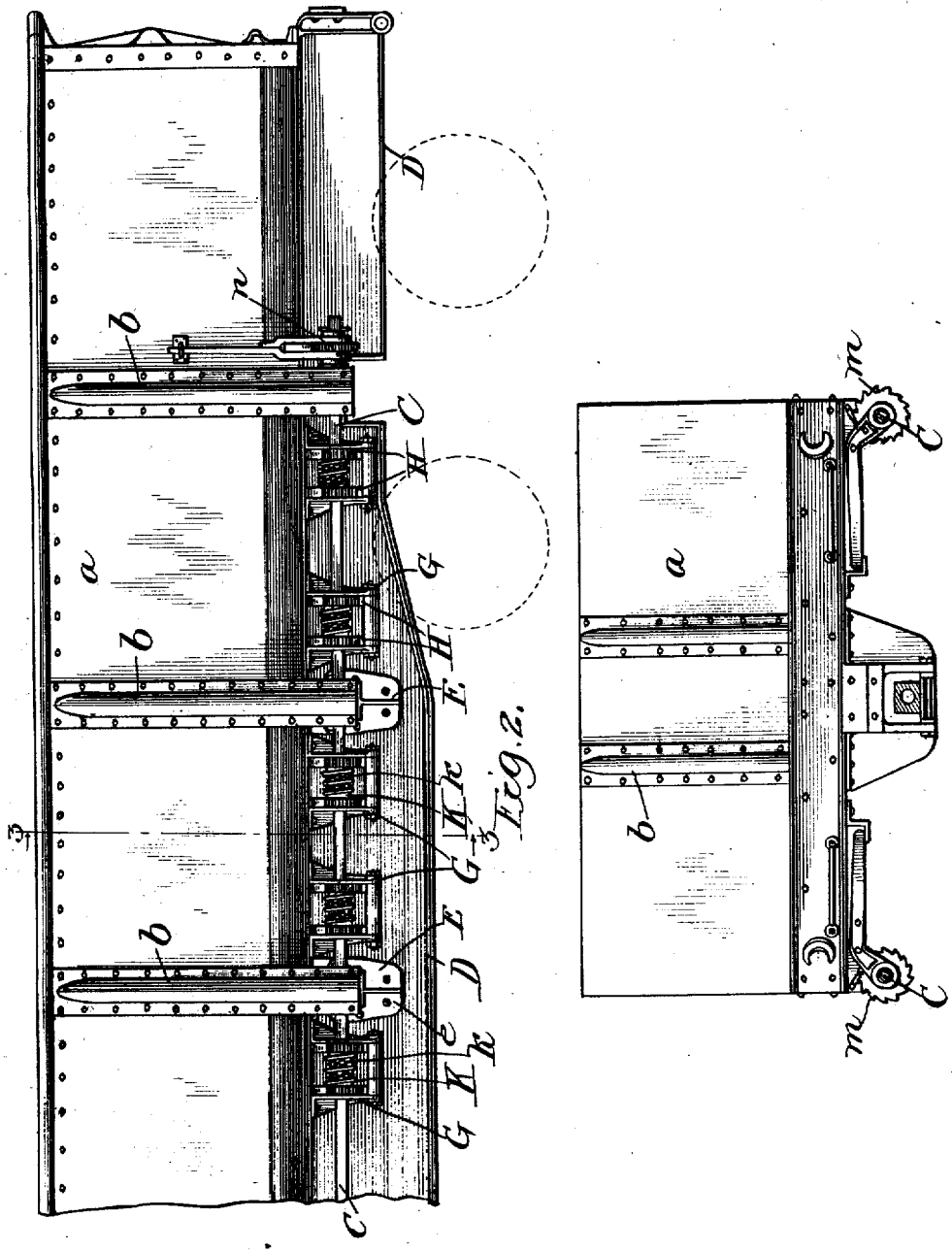

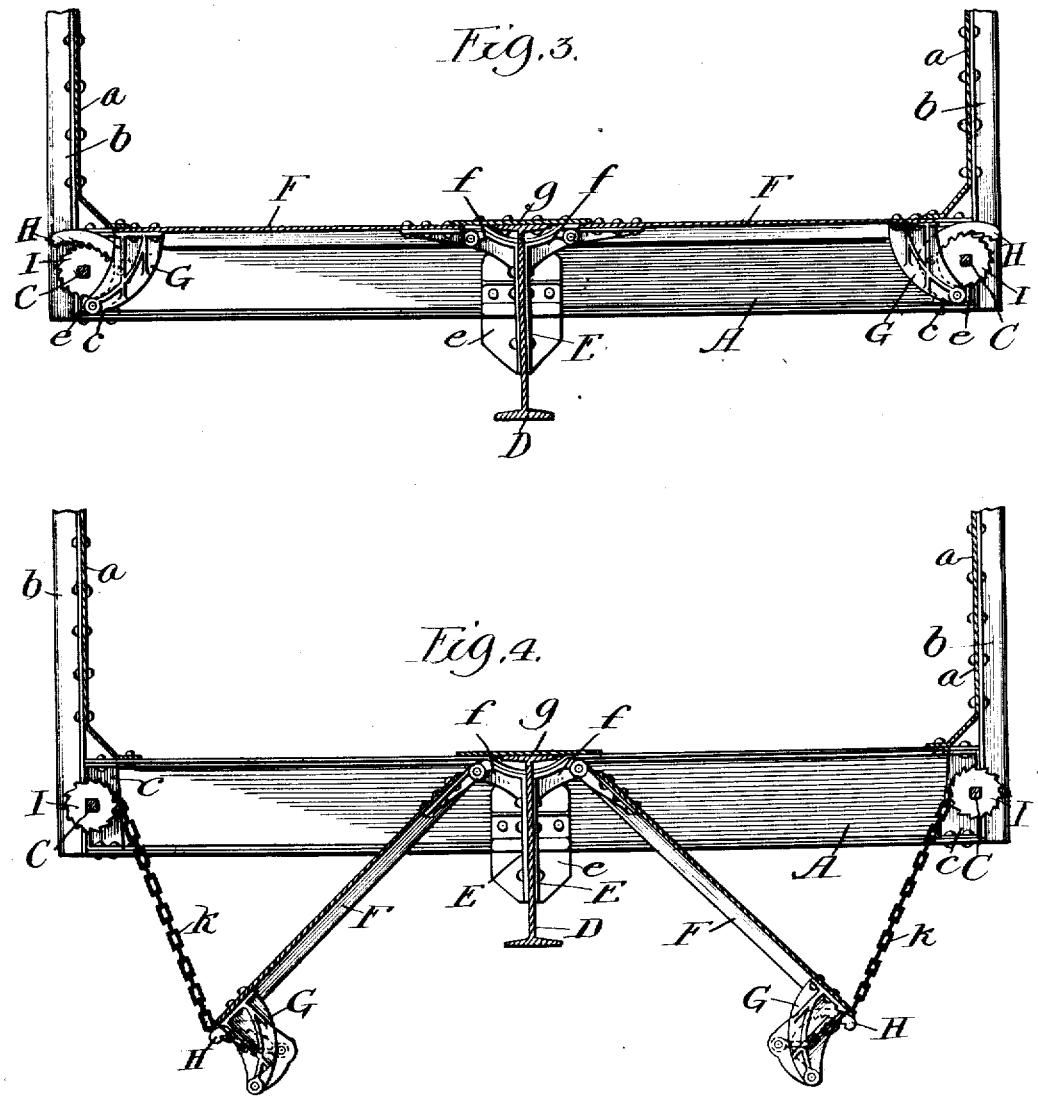

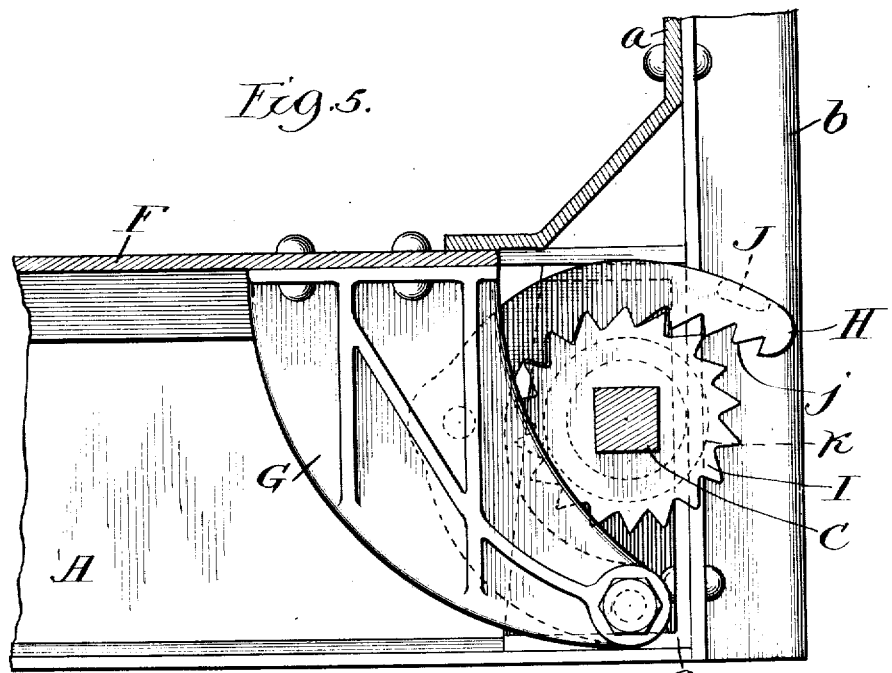
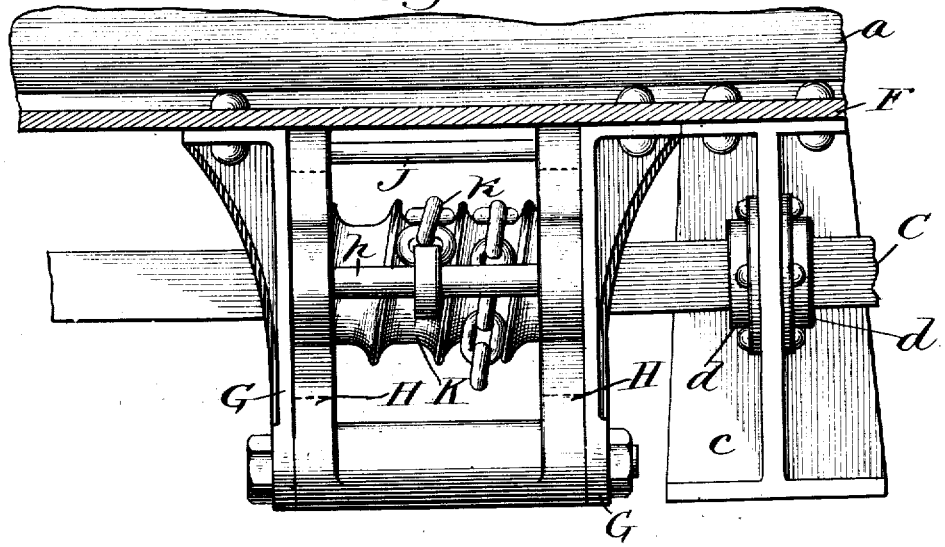

RALPH G. TAYLOR, OF DAVENPORT, IOWA, ASSIGNOR TO BETTENDORF AXLE COMPANY, OF DAVENPORT, IOWA, A CORPORATION OF IOWA.

DUMPING-CAR.

No. 911,090.                Specification of Letters Patent.        Patented Feb. 2, 1909.

Application filed October 14, 1907.  Serial No. 397,351.

*To all whom it may concern:*

Be it known that I, RALPH G. TAYLOR, a citizen of the United States, and a resident of Davenport, in the county of Scott and State of Iowa, have invented certain new and useful Improvements in Dumping-Cars, of which the following is a full, clear, and exact description.

My invention relates to dumping cars and particularly to the means for holding the drop-doors thereof closed.

Heretofore cars of this type have been so constructed that the doors were hinged directly or indirectly to the floor or parts of the floor construction, and this caused the load to bear more heavily on the parts to which said doors were hinged, and thus wore out the car much sooner than would otherwise have resulted. The construction of the underframe of many dump-cars has generally been such that the doors were very narrow and quite a platform extending the entire length of the car was left between the doors on each side of the centersills that had to be shoveled off by hand after the doors had been dropped. In addition to this, the shaft on which the chain that retained the doors in their closed position, was wound, was held in the desired position by a ratchet and pawl that were liable to become accidentally disengaged by the jar and shaking of the car while in motion and let the doors drop and discharge the load carried thereby, oftentimes causing not only loss of the freight, but the derailment of the car as well.

The objects of my invention are to relieve the floor of the car from an unequal distribution of weight, and to increase the superficial area of that portion of the floor composed of said drop-doors, and reduce the area of that portion of the floor requiring to be shoveled off after the doors have been dropped and thereby enable the car to be unloaded quicker.

A further object of my invention is to provide means for retaining the doors closed that will not shake or jar loose and permit the accidental dropping of said doors.

These objects I accomplish by the means hereinafter fully described, and as more particularly pointed out in the claims.

Figure 8:
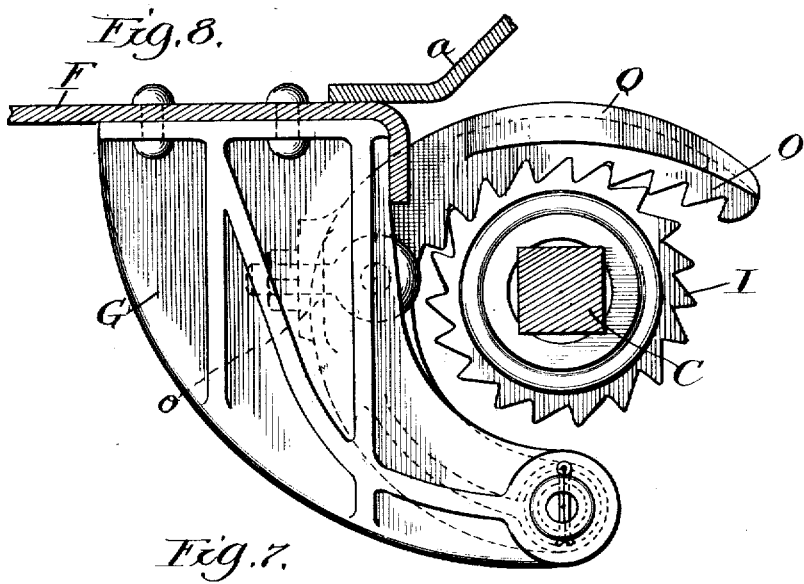
Figure 7:
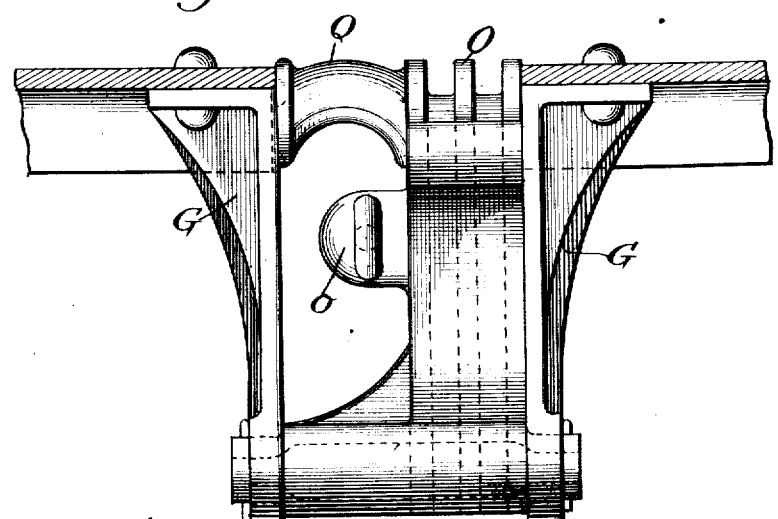
Figure 9:
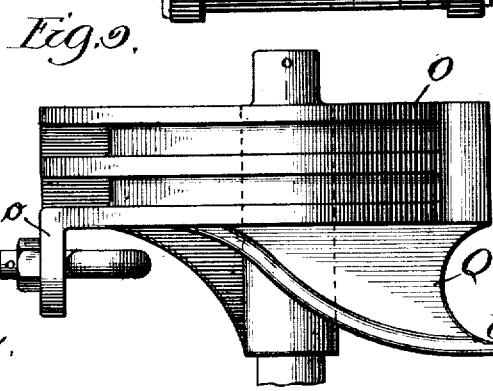

In the drawings:—Figure 1 is a side elevation of one end of the body of a gondola car embodying my invention. Fig. 2 is an end elevation thereof. Fig. 3 is a transverse section of said car taken on dotted line 3—3, Fig. 1, drawn to a larger scale, and showing the drop-doors in their closed position. Fig. 4 is a similar view showing the drop-doors open. Fig. 5 is a detail view on a still larger scale showing a transverse section of the lower portion of one side of the car-body with the drop-door locking mechanism in side elevation. Fig. 6 is a longitudinal section of the same part of the car looking at the outer end elevation of said locking mechanism. Fig. 7 is a detail view showing an outer edge elevation of a modified form of the hooks of said door-locking mechanism. Fig. 8 is a side elevation thereof, Fig. 9 is a plan view of the same.

The drawings illustrate the body of a gondola car to which my improvements are applied, and which consists of sheet metal sides $a$, riveted or otherwise secured to rolled metal posts $b$, $b$, whose lower ends extend below the plane of the floor of the car, and are secured to the ends of the transverse needle-bars and bolsters A, by means of metal angle-plates $c$. These angle-plates are, preferably, made of cast metal, and are provided with journal-boxes $d$, $d$, for a longitudinally disposed shaft C, and may be either riveted thereto, as shown, or cast in one piece therewith (not shown).

The needle-bars extend, as shown, from side to side of the car, and pass through suitable openings in the single center-sill D, which latter consists preferably of a single I beam of such dimensions that the said needle bars can pass through openings in its web, and be secured thereto by cast metal brackets $e$, $e$, riveted to both bars A and sill D. Alongside of these brackets $e$ hinge-plates E are riveted or otherwise secured to the web of the center sill, and have arms $f$ projecting out from their upper ends, that have knuckles on their outer extremities to which the knuckles of the hinge-plates of the drop-doors F, F, are pivotally connected. A narrow strip of plate-metal $g$ is, preferably, secured at its center of width to the top of the center-sill throughout the entire length of the car, and the doors F are of such width that when closed they form the floor of the car between the edges of the central floor-plate $g$ and the inwardly flanged lower longitudinal edges of the sheet metal sides of said car. These drop-doors are reinforced in any suitable manner and are provided with depending hangers G, the supporting-plate of which is riveted or otherwise secured to the under side of the doors next the swinging edge of the same. Each supporting-plate is provided with a pair of these hangers adjacent to the side edges of the same, which curve towards the sides of the car and have a suitable pivotal bolt extended through openings in their lower ends on which the heel of a sickle-shaped hook H is pivoted. I prefer to make these hooks in pairs, so spaced apart by a pivotal boss that a hook will be next each hanger, and each pair of said hooks are connected at about their centers of length by a cross-bar h, and at or adjacent to their extremities by a bar J.

When the doors are closed so that their swinging edges lap up against the inwardly flanged lower edge of the side of the car, the hooks H will extend over the shaft C and their under toothed edges j engage the toothed wheels I. There are two of these wheels for each pair of hooks, and they are secured on shaft C in such position and so spaced apart by an integral drum K that they register with said hooks. The drum is provided with spiral grooves in its circumference, and at one end a chain k is suitably secured thereto that extends and is secured by suitable means to the cross-bar h.

By turning shaft C so as to unwind chain k, the hooks H will be moved back under the doors, and as the latter drop, will be held in such position by the pressure of said chain upon cross-bar J thereof; when the door is closed to such an extent that the pressure of said chain will not be against bar J, the hook will, as the chain continues to wind on drum K, engage and ride over toothed wheels I. When the doors are closed the shaft C will be locked, if the doors are located between the body-bolsters and ends of the car, by a ratchet and pawl mechanism m at the end of the car, as shown in Fig. 2 of the drawings, or by a pawl and ratchet mechanism n on the side of the car, as shown in Fig. 1. When the shaft C is thus locked the engagement of hooks H with the toothed wheel assists in sustaining the doors, and, should the chains break, will continue to hold the doors closed, and if the pawl and ratchet mechanism becomes disengaged as well as the chains break said hooks would continue to hold the doors closed.

In Figs. 7, 8 and 9 I show a modified form of mechanism for keeping the drop-doors closed. In this modification I employ but one hook O of about twice the width of hook H, and provide it at about its center of length with a laterally projecting lug o to which one end of the chain is secured, and also provide it with a suitably curved arm Q near its extremity. The lug o is designed to take the place of the cross-bar h, and the arm Q to take the place of the cross-bar J of the construction shown in the first six figures of the drawings. This modification is more compact, and dispenses with the necessity of two toothed wheels on the shaft C, and therefore economizes both space and material.

What I claim as new is:—

1. A railway dump-car comprising side-walls, a center-sill consisting of a single I-beam, needle-beams extending through said center-sill, body-bolsters, drop-doors hinged to said center-sill, and means for raising and lowering the swinging ends of said doors.

2. A railway dump-car comprising side-walls the longitudinal portions of which are provided with integral inwardly flanged lower edges, a single center-sill, transverse means connecting said sides and center-sill, drop-doors hinged to said center-sill, chains for raising and lowering the swinging ends of said doors, longitudinal shafts journaled in the lower edges of said walls below the plane of the floor of the car, drums on said shafts on which said chains are wound, and pawl and ratchet mechanism for holding said shafts stationary.

3. A railway dump-car comprising side-walls the longitudinal portions of which are provided with integral inwardly flanged lower edges, a center-sill consisting of a single I-beam, a longitudinally disposed central floor-plate supported by said center-sill, drop-doors hinged to said center-sill, chains for raising and lowering the swinging ends of said doors, longitudinal shafts journaled in the lower edges of said walls, drums on said shafts on which said chains are wound, and pawl and ratchet mechanism for holding said shafts stationary.

4. A railway dump-car comprising side-walls, needle-beams, body-bolsters, a single center-sill, drop-doors hinged to said single center-sill, chains for raising and lowering the swinging ends of said doors, longitudinal shafts journaled parallel to the lower edges of said walls, drums on said walls upon which said chains are wound, hooks to which the opposite ends of said chains are secured and the heels of which are pivoted to hangers depending from said doors, and means for temporarily retaining said shafts in a stationary position.

5. A railway dump-car comprising side-walls the lower edges of the longitudinal portions of which are flanged inwards, a single-center-sill, transverse means connecting said sides and center-sill, drop-doors hinged to said single center-sill, chains for raising and lowering the swinging ends of said doors, longitudinal shafts journaled parallel to the lower edges of said walls, drums on said walls upon which said chains are wound, hooks to which the opposite ends of said chains are secured and the heels of which are pivoted to hangers depending from said doors, and means for temporarily retaining said shafts in a stationary position.

6. A railway dump-car comprising side-walls the lower edges of the longitudinal portions of which are flanged inwards, a center-sill consisting of a single I-beam, a longitudinally disposed central floor-plate supported by said center-sill, drop-doors hinged to said center-sill, chains for raising and lowering the swinging ends of said doors, longitudinal shafts journaled parallel to the lower edges of said walls, drums on said walls upon which said chains are wound, hooks to which the opposite ends of said chains are secured and the heels of which are pivoted to hangers depending from said doors, and means for temporarily retaining said shafts in a stationary position.

7. In a dump-car, a drop-door hinged at its longitudinal edges nearest the center-sill, hangers secured to and depending from the opposite longitudinal edges thereof, a sickle-shaped hook the heel of which is pivoted to the lower extremity of said hanger and having a laterally projecting member adjacent to its point, a chain for raising said door one end of which is secured to the center of length of said hook, and means attached to said car for winding and unwinding said chain and adapted to be engaged by said hook.

8. In a dump-car, a drop-door hinged at its longitudinal edge nearest the center-sill of the car, hangers secured to and depending from the opposite longitudinal edge thereof, a sickle-shaped hook the heel of which is pivoted to the lower extremity of said hanger, having its under edge toothed, and having a lateral member projecting therefrom near its point, a chain for raising said door one end of which is secured to said hook mediate its ends, and means attached to the car for winding and unwinding said chain and adapted to be engaged by said hook.

9. In a dump-car, a drop-door hinged at its longitudinal edge nearest the center-sill, hangers secured to and depending from the opposite longitudinal edge thereof, a sickle-shaped hook the heel of which is pivoted to the lower extremity of said hanger, having its under edge toothed, and having a lateral member projecting therefrom near its point, a chain for raising said door one end thereof secured to said hook mediate its ends, a longitudinal shaft journaled below and parallel to the longitudinal sides of the car, means for temporarily retaining said shaft in position, and toothed wheels thereon adapted to be engaged by said hooks.

10. In a dump-car, a drop-door hinged at its longitudinal edge nearest the center-sill, a pair of hangers depending from the opposite longitudinal edge thereof, a pair of sickle-shaped hooks having their under edges toothed and their heels pivotally connected to the lower ends of said hangers, and having cross-bars connecting them at their points and mediate their ends, a chain for raising said door secured at one end to the middle cross-bar, and means for raising and lowering said chain.

11. In a dump-car, a drop-door hinged at its longitudinal edge nearest the center-sill, a pair of hangers depending from the opposite longitudinal edge thereof, a pair of sickle shaped hooks having their under edges toothed, and their heels pivotally connected at the lower ends of said hangers and having cross-bars connecting them at their points and mediate their ends, a chain for raising said door secured at one end to the middle cross-bar, a longitudinal shaft journaled to the longitudinal sides of the car, means for temporarily retaining said shaft in position, and toothed wheels thereon adapted to be engaged by said hooks.

12. In a railway dump car means for raising and lowering the doors, comprising a chain the lower end of which terminates in a hook pivotally connected to the underside of said doors, and a shaft upon which said chain is wound and which is journaled inside the plane of the side-walls of the car and below the plane of the floor of the car.

13. In a railway dump-car means for raising and lowering the doors thereof comprising a chain, a hook pivotally connected to the underside of said door and to which the lower end of said chain is connected mediate its pivot and its free point, and a shaft upon which said chain is wound.

14. A railway dump car having a series of doors in its bottom, hooks pivotally secured to the underside of said doors, and revoluble longitudinal shafts journaled inside the plane of the side-walls of the car and in a plane below the bottom of said car which are automatically engaged by said hooks when said doors are closed.

In testimony whereof I have hereunto set my hand and seal this 26th day of September, A. D., 1907.

RALPH G. TAYLOR. [L. S.]

Witnesses:
  HENRY BELLINGHAUSEN,
  JOSEPH W. BETTENDORF.